Feb. 19, 1957
R. E. ALBRECHT ET AL
2,782,052
BOAT TRAILER ATTACHMENT FOR SUPPORT OF THE BOAT POWER MEANS
Filed July 18, 1955
2 Sheets-Sheet 1
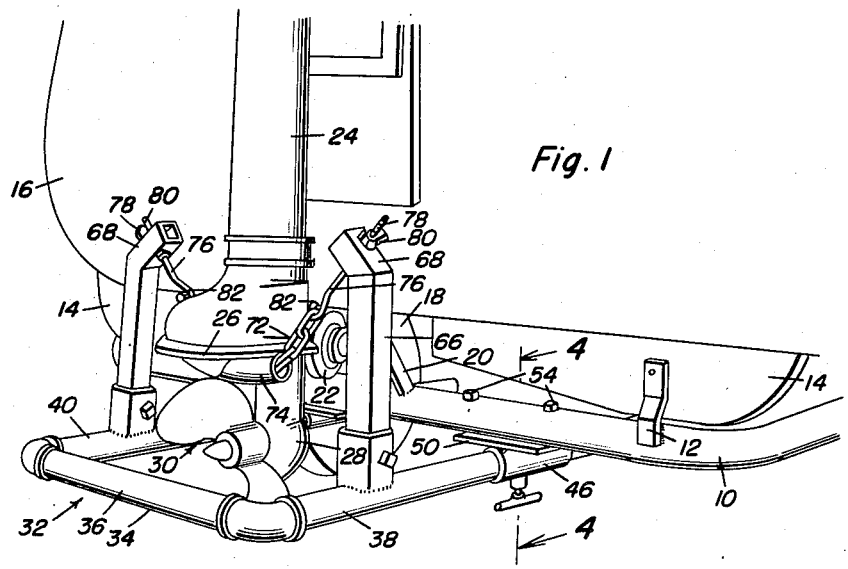
Fig. 1
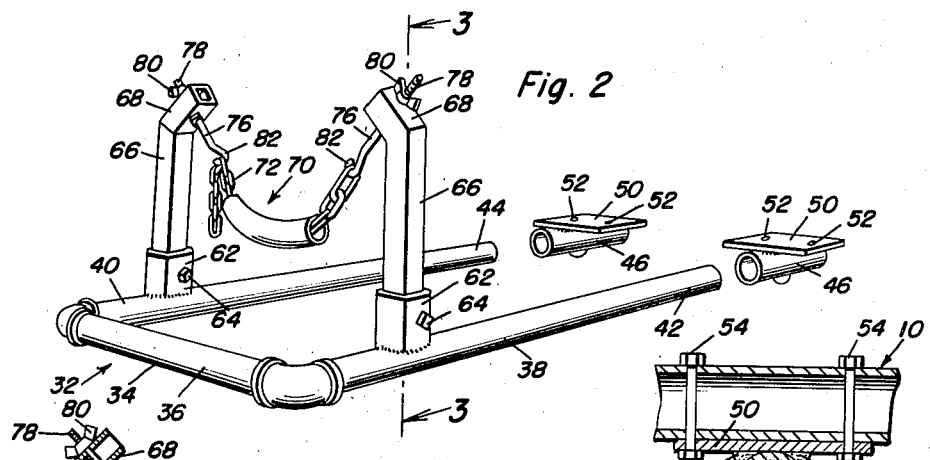
Fig. 2
Fig. 4
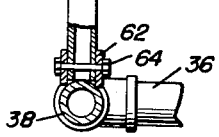
Fig. 3
Robert E. Albrecht
Charles W. Bloomquist
INVENTORS
BY *Clarence A. O'Brien
and Harvey B. Jacobson*
Attorneys Feb. 19, 1957  R. E. ALBRECHT ET AL  2,782,052
BOAT TRAILER ATTACHMENT FOR SUPPORT OF THE BOAT POWER MEANS
Filed July 18, 1955  2 Sheets-Sheet 2
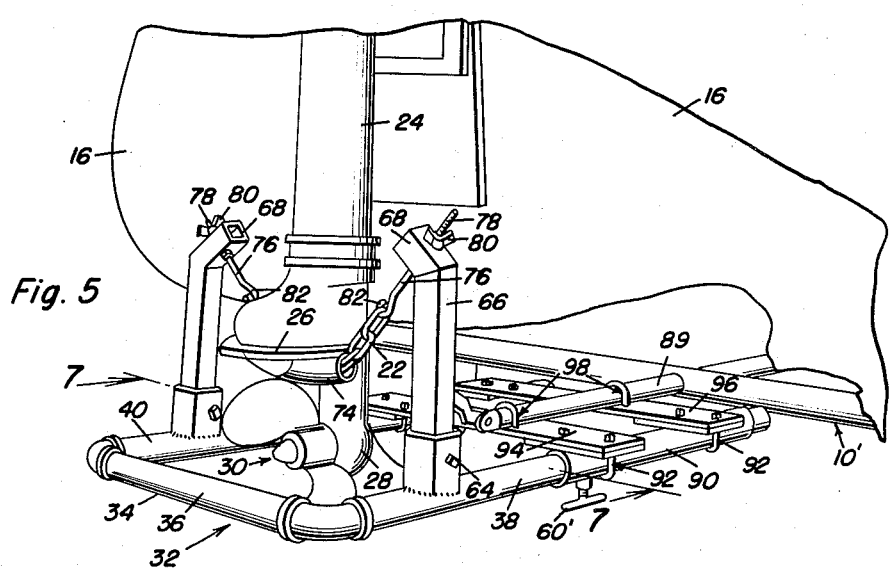
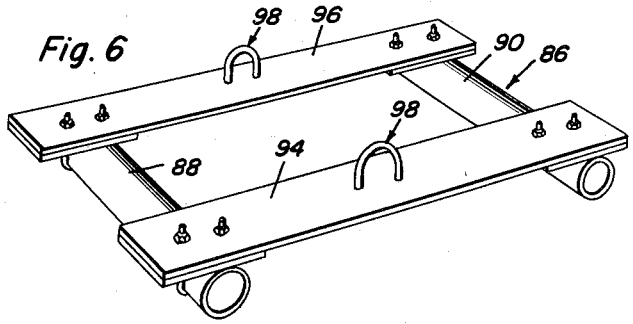
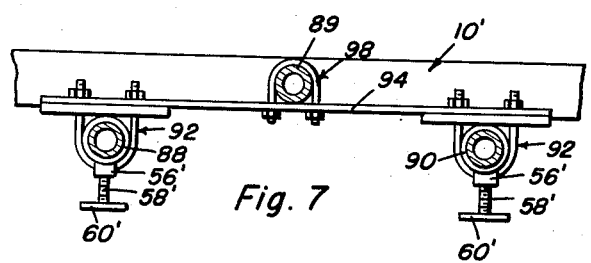
Robert E. Albrecht
Charles W. Bloomquist
INVENTORS United States Patent Office 2,782,052
Patented Feb. 19, 1957

2,782,052
BOAT TRAILER ATTACHMENT FOR SUPPORT OF THE BOAT POWER MEANS

Robert E. Albrecht and Charles W. Bloomquist, Bismarck, N. Dak.

Application July 18, 1955, Serial No. 522,722

1 Claim. (Cl. 280—150)

This invention relates generally to vehicular trailer structure and is more particularly concerned with a detachable support attachment for boat trailers for affording protection to the power means of a boat transported on the trailer as well as removing the weight of such power means from the boat transom upon which it is mounted, whereby the weight thereof is carried by the trailer attachment.

A primary object of invention in conformance with that set forth above is to provide a substantially universal support attachment for most types of boat trailers whereby flexible adjustable support means are carried for engagement with the cavitation plate portion of the power means of a boat being transported on the trailer.

A further object of invention in conformance with that set forth above is to provide a readily installable boat trailer attachment which is sturdy in construction, economical to manufacture, and highly utilitarian in purpose.

Although the novel "trailer attachment" will be described relative to an outboard motor mounted on a boat transom while the boat is being transported on the boat trailer, it is to be contemplated within the purview of invention that the novel attachment may be utilized with boats incorporating inboard engines wherein comparable cavitation plate, skeg, driveshaft, propeller structure, etc., is included.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the novel supporting attachment in position on a rear transverse frame portion of a boat trailer;

Figure 2 is a perspective view of the support attachment removed from the boat trailer;

Figure 3 is a sectional view taken substantially on line 3—3 of Figure 2;

Figure 4 is an enlarged sectional view taken substantially on line 4—4 of Figure 1;

Figure 5 is a perspective view of the boat support attachment including adapting structure for mounting said attachment on a trailer incorporating a central longitudinally extending reach pole of another type boat trailer;

Figure 6 is an enlarged perspective view of the adapter attachment for the support attachment shown in Figure 5; and Figure 7 is a sectional view taken substantially on line 7—7 of Figure 5.

Indicated generally at 10 is a rear frame portion of the boat trailer, which has suitably secured thereon by means of vertically extending strap support elements 12 (only one being shown) which mount spaced cradle portions 14 of the trailer which are generally padded and engage the bottom portion of the boat adjacent the rear transom 16 of the boat. The trailer frame 10 is supported on suitable wheel assemblies, only one being shown at 18, and may include an upwardly extending support strap portion 20 which carries at the upper end thereof a roller pulley 22 engageable with the bottom of the boat to aid in the placing of the boat hull on or off of the trailer frame.

Indicated at 24 is a housing portion of an outboard motor which includes a cavitation plate portion 26 and a lower skeg portion 28 having suitably mounted therein the propeller shaft and propeller indicated generally at 30.

Indicated generally at 32 is the novel boat trailer support attachment, which includes a U-shaped support frame 34 including a bight portion 36 suitably connected to a pair of side frame members 38 and 40, the ends 42 and 44, respectively, of which being removably received within a pair of spaced longitudinally extending socket members 46 each of which having secured thereto by means of the weld 48, see Figure 4, a flat securing plate 50 having a pair of spaced aperture portions 52 therein which cooperate with alignable aperture portion in the rear transverse portion of the frame 10 being secured thereon by means of suitable fastening bolts 54, for example. The socket members 46 each include extending from a lower surface portion thereof a transverse collar portion 56 which is suitably tapped and threadedly receives a threaded lock bolt element 58 having a transverse end handle 60, said locking bolt element being engageable with the side arms 38 or 40 for retaining the U-shaped support frame in a relatively fixed position on the boat trailer. The side frame members 38 and 40 each include adjacent the bight portion 36 an upwardly opening support socket element 62 which has a transverse lock screw element 64 extending through one of the side wall portions and engageable with a lower end portion of a vertically extending support element 66 which includes an upper angular end portion 68, the support elements in the respective side members being mutually convergent.

A flexible support element is indicated generally at 70 and may include a flexible link chain portion 72 having a piece of rubber tubing or any other suitable padding 74 concentrically disposed thereon, said portion 74 being engageable beneath the cavitation plate of the power means of the boat, the chain 72 being engageable at opposite end portions to adjusting bolt 76 which has a threaded end portion 78 extending through the upper end of the vertically extending support element 66, and having threadedly and adjustably secured thereon a suitable wing nut element. The bolt elements 76 include on their lower end portions connected to the flexible chain 72 a hook end portion 82 which facilitates the adjustment of said chain beneath the cavitation plate 26 as well as the removal of said chain from said hook portions.

Thus after the boat hull has been positioned on the trailer frame 10, the flexible element 72 by virtue of the adjustable wing nuts 80 on the threaded end portion 78 of the bolt elements 76 may be tightened beneath the cavitation plate 26 whereupon tension is applied to the flexible element 72 and a substantial portion of the load is more equally distributed on the frame 10 by means of the attachment 32. The bight portion 36 of the U-shaped frame serves to protect the propeller and shaft of the collar means of the boat.

As seen in Figure 5, a trailer frame is indicated generally at 10', this type of trailer including a longitudinally extending centrally located reach pole 89 which has secured thereto a suitable adapter support assembly 86 which serves the same purpose as a longitudinally extending socket member 46 for supporting the side frame members 38 and 40 as previously described.

The adapter assembly 86 includes a pair of mutually parallel tubular support elements 88 and 90 which are connected by means of suitable U-bolt assemblies 92, see Figure 7, to transverse support plate elements 94 and 96 which have extending upwardly therefrom centrally disposed U-bolt securing assemblies 98 which are engageable about the reach pole 89, see Figure 5.

Included on a lower surface portion of the tubular members 88 and 90 are downwardly extending inwardly tapped collar portions 56' which threadedly receive the securing screw element 58' having secured thereto a transverse handle portion 60'.

The use of the adapter of Figures 5 through 7 with the support frame attachment is believed readily apparent and accordingly further explanation is believed unnecessary.

Various positional directional terms such as "front," "rear," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A boat trailer support attachment comprising a U-shaped support frame including a bight portion connected to a pair of side frame members, attaching means contained on end portions of the side frame members for detachably connecting the U-shaped frame in a rearwardly extending position from a boat trailer, a pair of oppositely disposed vertical support elements extending upwardly from the spaced frame members, a flexible support element carried at opposite end portions of the upwardly extending support elements for engagement beneath the cavitation plate of the power means of a boat being transported, said vertical support elements including a lower end portion removably secured in an upwardly opening socket member on an upper portion of the side frame members, the support elements including mutually convergent upper end portions, said flexible support element including an intermediate portion having a centrally padded portion engageable with the cavitation plate of the power means of the boat being transported, adjusting bolt elements extending through the upper convergent end portions of the support elements, opposite end portions of the flexible support element being secured to said adjusting bolt elements for controlling the amount of tension applied on the plate.

References Cited in the file of this patent

UNITED STATES PATENTS

| | | |
|---|---|---|
| 1,412,192 | Moore | Apr. 11, 1922 |
| 2,494,509 | Gruska | Jan. 10, 1950 |
| 2,664,298 | Shelby | Dec. 29, 1953 |
| 2,679,329 | Stout | May 25, 1954 |